United States Patent [19]

Wong

[11] 4,330,637

[45] May 18, 1982

[54] ENCAPSULATED ELECTRONIC DEVICES AND ENCAPSULATING COMPOSITIONS

[75] Inventor: Ching-Ping Wong, Lawrence Township, Mercer County, N.J.

[73] Assignee: Western Electric Company, Inc., New York, N.Y.

[21] Appl. No.: 222,443

[22] Filed: Jan. 5, 1981

[51] Int. Cl.³ .................................................. C08K 5/34
[52] U.S. Cl. ............................... 524/720; 174/52 PE; 260/245.91; 264/272.11; 524/863; 524/90
[58] Field of Search ......... 260/42.21, 37 SB, 45.75 R, 260/45.75 G, 45.75 M, 45.75 P, 45.75 F, 45.75 N; 264/272.11; 525/4; 174/52 PE

[56] References Cited

U.S. PATENT DOCUMENTS

| | | | |
|---|---|---|---|
| 3,137,665 | 6/1964 | Retford | 260/37 SB |
| 3,689,454 | 9/1972 | Smith | 260/37 SB |
| 3,965,065 | 6/1976 | Elliott | 260/37 SB |

FOREIGN PATENT DOCUMENTS 51-11377  1/1976  Japan .

OTHER PUBLICATIONS

A. Kaneda, Chem. Abs. 85:39929q, Mar. 1976.
Wong, J., Am. Chem. Soc., vol. 96, pp. 7149-7150 (1974).
Wong, Tetrahedron Letters, No. 31, pp. 2637-2640 (1975).
Martarano, J., Physical Chemistry, vol. 80, No. 21, pp. 2389-2393 (1976).
Horrocks, J. American Society, vol. 98, pp. 7157-7162 (Nov. 1976).

*Primary Examiner*—Paul R. Michl
*Attorney, Agent, or Firm*—A. M. Tobia

[57] ABSTRACT

An electronic device such as an integrated circuit is encapsulated within a silicone resin formulation having a metallo-porphyrin compound contained therein. The compound is cleaved by HCl to form a porphyrin diacid chloride and a free metal having the capability of chelating chloride ions and hydroxyl groups thereby preventing corrosion and anionic attack of metallic circuit elements and development of unwanted conductive pathways.

29 Claims, 6 Drawing Figures

DURING TESTING SETUP

DURING MEASUREMENT SETUP

APPARATUS FOR SYNTHESIS OF
METALLO-PORPHYRIN

ENCAPSULATED ELECTRONIC DEVICES AND ENCAPSULATING COMPOSITIONS

TECHNICAL FIELD

This invention relates to electronic devices such as semiconductor devices and integrated circuits having silicone encapsulants and, more particularly, to electronic devices wherein the silicone encapsulant includes additives to prevent corrosion of the device and improve the moisture protection capability of the encapsulant.

BACKGROUND OF THE INVENTION

Electronic devices, particularly integrated circuits and semiconductors, are usually coated or encapsulated with a polymeric silicone resin, such as a room temperature vulcanized (RTV) silicone elastomer, to protect the device from mechanical damage and from adverse environmental effects of temperature and humidity.

In the process of making the encapsulant, trace amounts of unwanted anions, particularly chloride ions, and HCl are generally introduced. For example, HCl is a by-product in the preparation of several of the materials used to make the encapsulant, in particular the base polymer, crosslinker, and catalyst. The acid is not adequately removed from these and is, therefore, subsequently introduced into the encapsulant. Chloride ions are introduced by the dissociation of NaCl, hydrolysis of HCl, and as a residue of solder flux. The presence of these contaminants leads to device malfunctioning and failure. HCl and chloride ions, in particular, cause corrosion of the metallic components of the electronic device, dendrite formation, and eventually short circuiting due to the formation of metallic dendritic bridges between the cathode and anode of the device. The problem is exacerbated by the presence of moisture which contributes to the formation of unwanted conductive pathways.

Attempts to further reduce the concentration of contaminants present in encapsulating compositions and to lessen moisture problems by modifying the method of preparation have proven unsuccessful. Another approach has been to sequester the contaminants so that they are not later free to migrate under the conditions of high bias, temperature and moisture that typify the operating environment of many electronic devices. For example, Kaneda reported in Chem. Abstracts (March, 1976, p. 39929q, Japanese Patent No. 76-11377), under the title "Semiconductor Sealing Resin Composition Containing Crown Ethers or Cryptate Ethers as the Alkali Metal Ion Getters", that the addition of crown ethers or cryptate ethers resulted in better operational stability of resin-molded semiconductor devices by forming stable complexes with alkali metal ion contaminants. However, the formulation Kaneda discloses is limited to the sequestering of cations.

SUMMARY OF THE INVENTION

The foregoing and other problems are solved in accordance with one aspect of the present invention by encapsulating a device with an encapsulating composition containing therein a metallo-porphyrin compound. This prevents migration of HCl and anions on the device by immobilizing these molecules by sequestering or chelating them and at the same time further improves electrical performance of the device by chelating hydroxyl groups so that they are no longer available to bind water molecules.

The metallo-porphyrin may be prepared in accordance with another aspect of the invention by (a) mixing a porphyrin free base, a hydrated metallo-$\beta$-diketonate, and a nonvolatile, high boiling point solvent; (b) heating the mixture to reflux using a short reflux tube while passing a slow flow of inert gas through the reaction flask; (c) removing the solvent; and (d) cooling after the solvent is removed.

DETAILED DESCRIPTION

Figure 1:
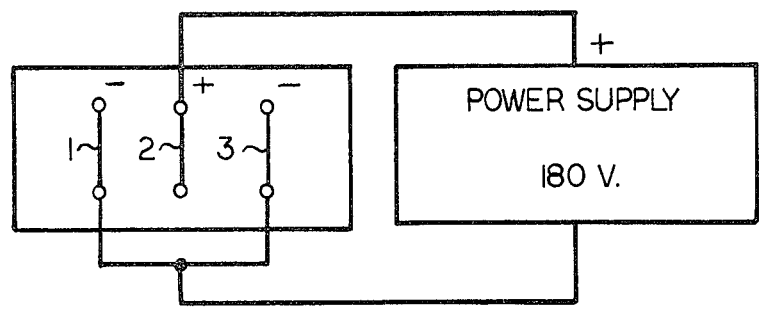
FIG. 1 illustrates schematically an apparatus employed to apply a test voltage to a triple-track test circuit encapsulated in accordance with the present invention.

Electronic devices are usually coated with a polymeric elastomer to protect the device from adverse environmental factors. However, the encapsulant, such as a polymeric silicone, itself carries contaminants that are detrimental to device functioning. The presence of anionic contaminants such as halogen ions, in particular, chloride ions, and HCl lead to corrosion of the metallic anode. It is believed that, in the presence of moisture, chloride ions and HCl react with the metallic anode with the consequent formation of a metallic chloride complexion that behaves as an electrolyte and migrates under high bias. It is further believed that under the operating conditions of high bias, humidity and temperature, the metallic chloride ion disassociates, metal is deposited, and metallic dendrites form. The chloride may then be released as a gas or recycled as HCl to start the cycle over. When the dendritic connection between cathode and anode is continuous, a migrative short circuit has been established that results in device malfunctioning and possibly device failure.

The present invention helps prevent such device malfunctioning by adding a metallo-porphyrin compound to an encapsulant composition. The metallo-porphyrin, comprising a porphyrin ligand and a metal attached thereto, is stable in both water and organic solvents such as, xylene, toluene, benzene, etc. However, the compound is extremely sensitive to the presence of acid. For example, even trace amounts of HCl causes the cleavage of the metal from the porphyrin ligand and the concomitant sequestering of the acid by the porphyrin ligand to form a porphyrin diacid chloride. The porphyrin diacid chloride is nontoxic and stable even at relatively high temperatures. The cleaved metal is then free to chelate anions such as chloride ions and hydroxyl groups.

The porphyrin ligand by itself is thermally and hydrolytically inert. It possesses a well defined structure, is non-toxic and hydrophobic in nature. It alone can be added to an encapsulating composition to reduce moisture penetration, enhance device stability and sequester HCl molecules.

Any porphyrin having the structural formula:

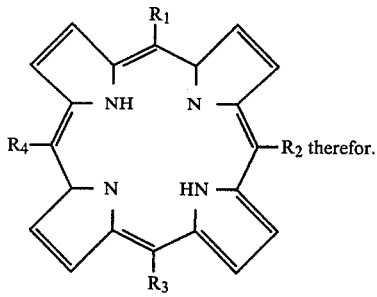

wherein $R_1$, $R_2$, $R_3$ or $R_4$, is a 1 to 7 carbon alkyl, a phenyl, a p-methyl phenyl, a fluorophenyl, and any derivatives thereof, is suitable for use in the present invention.

However, it has been found that the addition of a metal increases these capabilities even further by providing for the chelating of anions.

The metal is preferably selected from the lanthanide series, particularly, those represented in the later part of the series such as, terbium, dysprosium, holmium, erbium, thulium, ytterbium, and lutetium because of their stability as a lanthanide-porphyrin compound. The actinides, with the exception of thorium, are not suitable because of their radioactivity. Any of the transition metals are suitable.

The metal ion is complexed to any coordinate ligand. The metal ion is preferably complexed with a β-diketonate ligand, since it tends to stabilize the metal. The preferred β-diketone includes acetylacetone and its derivatives, such as ethylacetylacetone, benzoylacetylacetone, etc. In the preferred embodiment of the invention a lanthanide β-diketonate is used since lanthanide metals have a greater capability to expand their coordination number than the transition metals, consequently, they chelate a greater number of anions. Whereas a nickel β-diketonate would be able to chelate 1 or 2 monovalent anions because it has a coordination number of 4 to 6, a lanthanide-β-diketonate can chelate 1 to 4 monovalent anions because it has a coordination number of 6 to 12.

A typical reaction of the metallo-porphyrin compound in the presence of an acid such as HCl is exemplified by the following reaction of lanthanide-β-acetylacetonatetetraphenylporphyrin [Ln (acac) TPP] in the presence of HCl and contaminating chloride ions:

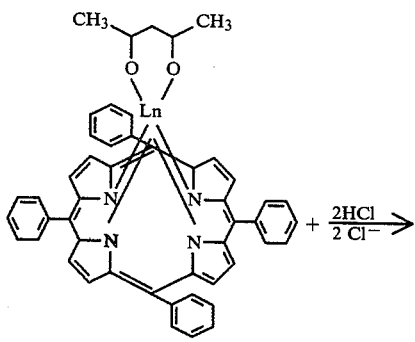

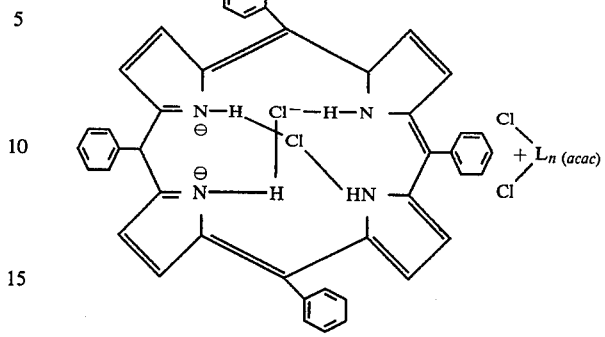

In the preferred embodiment of the invention, at least a stoichiometric amount of a lanthanide (acac) tetraphenylporphyrin is added to an RTV silicone elastomer encapsulant and is used to encapsulate an electronic device. Said encapsulant preferably includes in addition to the lanthanide (acac) tetraphenylporphyrin, a hydroxy terminated polydimethoxysiloxane, a crosslinking agent, a titanate catalyst, and a stabilizer.

Examples of suitable crosslinking agents are trimethoxymethylsilane, triethoxymethylsilane, and trimethoxyvinylsilane. Examples of suitable catalysts are tetra-n-butyltitanate, tetraisopropyltitanate, tetraethyltitanate and tetraisobutyltitanate. Examples of suitable stabilizers are metal β-diketonates such as nickel acetylacetonate and chromium acetylacetonate. Because of the presence of the metal-β-diketonate ligand, the stabilizer may be omitted.

The absolute amount of compound to add is determined by performing ordinary potentiometric titration or electron capture techniques on each of the component parts used to make the final elastomer encapsulant to determine their total chloride ion content. Generally the encapsulating material used in our examples, i.e., RTV silicone elastomer, contains about 50 ppm HCl per 10 g of elastomer.

The term stoichiometric as applied to the amount of metallo-porphyrin compound to be added to the elastomer refers do that minimum amount of compound required to bind all of the chloride present in the elastomer. It is assumed for these purposes that two moles of HCl is bound by one mole of metallo-porphyrin compound. The trapping of HCl by tetraphenylporphyrin is self evident since metallo-tetraphenylporphyrin is red-purple in color and porphyrin diacidchloride is green.

Figure 2:
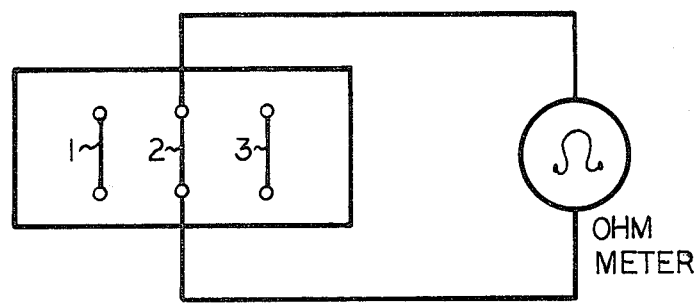
FIG. 2 illustrates schematically a resistance measurement setup used to evaluate the resistance of the triple-track test circuit after a test voltage is applied in accordance with FIG. 1.

The effectiveness of ion trapping by test compounds within a silicone encapsulant is determined by electrical tests on a triple track testing circuit of the type depicted in FIG. 1. This triple track testing circuit comprises fine closely spaced tracks 1, 2 and 3 of tantalum nitride on an alumina substrate and is coated with the encapsulant to be tested. The lines 1, 2 and 3 and spaces therebetween are approximately 3 mils in width. For testing, the test circuit is electrically connected to a power supply and placed in a battery jar within an oven chamber. The circuit is then exposed to a high temperature (100° C.), high relative humidity (96%) environment and a positive 180 volt dc bias supplied to the center track 2 while the outer tracks 1 and 3 are held at ground potential. After applying this bias for a desired period of time, the bias is removed and the resistance along the center tantalum nitride track 2 is measured by means of an ohmmeter (FIG. 2). Change of resistance of the tantalum nitride is a measure of the degree of electro-oxidation occurring, which in turn is a measure of the mobile impurities in the silicone which cause the resistor to anodize. The change of the resistance with respect to the original resistance is, therefore, a measure of the electro-oxidation process which is caused by migrating ions and, in particular, anions in the silicone resins. The greater the change of resistance with time due to the oxidation process, the greater the degree of migration of the anions in the silicone resins. Consequently, the less the resistance changes with testing time, the better the encapsulant material will be.

Figure 3:
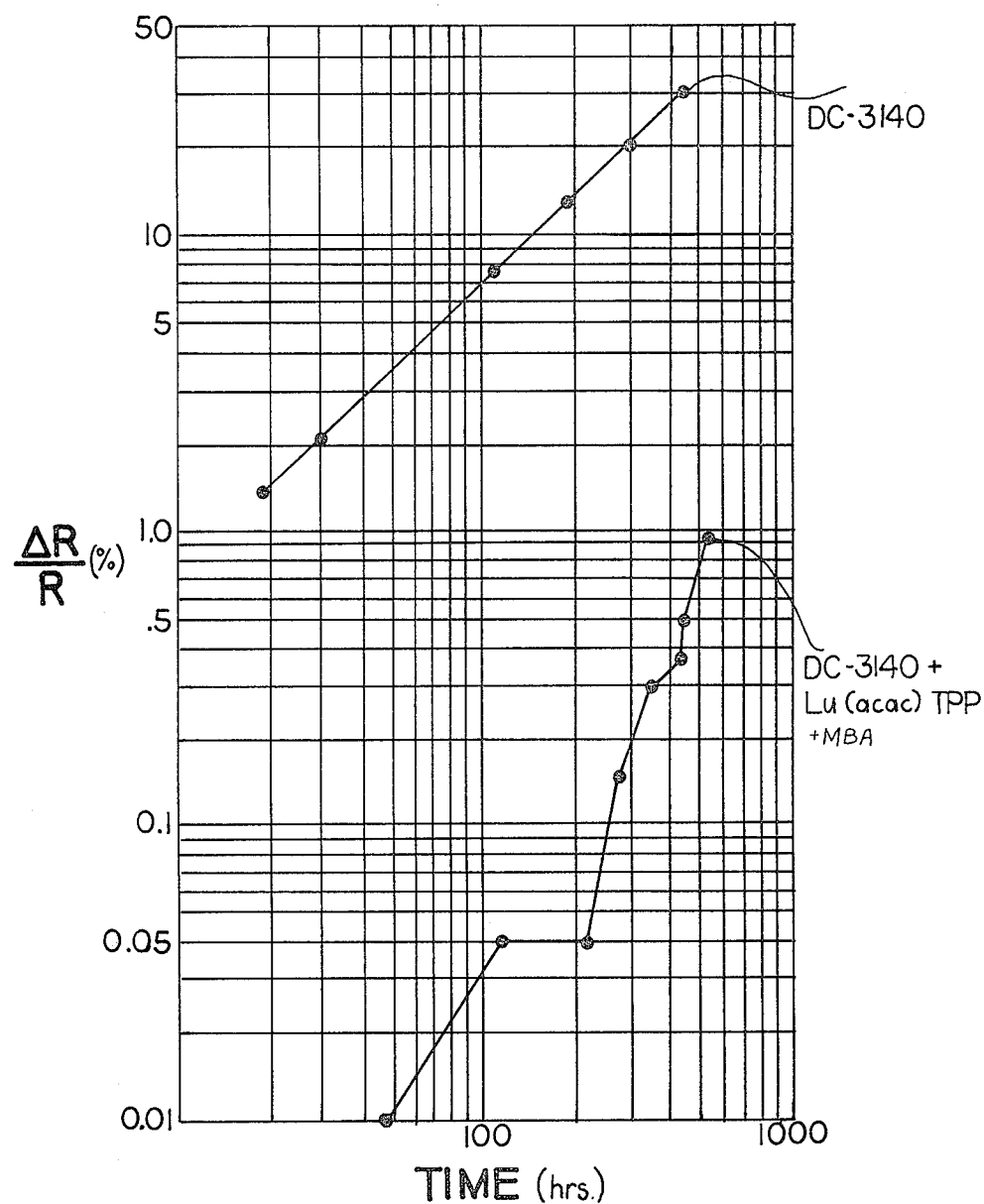
FIG. 3 is a graph representing the test results of the evaluation performed with the setup of FIG. 2.

FIG. 3 is a graphical representation of the results of such a test, using DC-3140 resin, a Dow Corning RTV elastomer, with and without the addition of 0.2% lutetium (acac) tetraphenylporphyrin [Lu (acac) TPP] and 0.005% metal-$\beta$-benzoylacetonate (MBA). The change of resistance ($\Delta R$) over initial resistance (R) as a function of time is plotted for each.

Based upon these test results it is readily apparent that the lutetium (acac) tetraphenylporphyrin lessens the resistance changes occurring under conditions of high bias, temperature and humidity thereby enhancing the life of the electronic device.

The metallo-porphyrins used herein were prepared by a procedure which is a modification of a procedure previously developed by me and published in *Journal of American Chemical Society*, 96, 7149 (1974); however, the results according to that published procedure were not always reproducible, therefore, I have modified the procedure so that better results are consistently obtained. This modification involves using twice as much solvent than previously published and requires complete removal of solvent. The procedure described is for the synthesis of lanthanide (acac) tetraphenylporphyrin but is equally suitable for the synthesis of all the metals in the periodic table. The respective free base porphyrins ($H_2TPP$) are prepared by established procedures.

Figure 4:
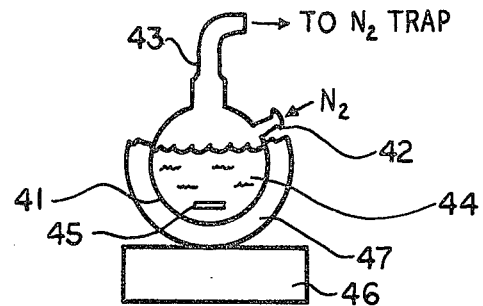
FIG. 4 and FIG. 5 are typical apparatuses which may be employed in the synthesis of a metallo-porphyrin.
Figure 5:
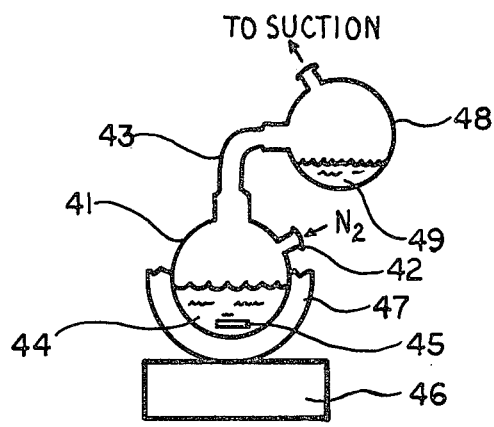

The general preparation procedure is exemplified in FIGS. 4 and 5.

To a 100 ml round-bottom flask 41 equipped with a nitrogen inlet 42 and a short L-shaped reflux tube 43 are added reactants 44, $H_2TTP$ (1.0 g, $1.63 \times 10^{-3}$ mol), a hydrated lanthanide $\beta$-diketonate such as $\beta$-acetylacetonate (acac), $\beta$-acetylcamphor or 2,2,6,6-tetramethylhepatanedione (2.0 g, $4.0 \times 10^{-3}$ mol), and a suitable solvent such as, imidazole, 1,2-dichlorobenzene, or 1,2,4,-trichlorobenzene ($\sim$75-100 ml). Since the above-mentioned solvents are toxic, a good hood should be used. The solution is stirred with a magnetic stirrer 45 driven by a motor 46 and heated by means of a heating mantle 47 to reflux (215° C.) while passing a slow flow of nitrogen through the flask 41. When the reaction product first begins to form, a collection vessel 48 (FIG. 5) is added to receive distilled material 49 consisting of solvent and acetylacetonate. It is important that the reflux tube 43 be short since, if a standard water-cooled reflux condenser is used, both the solvent and acetylacetone will be returned to the reaction vessel and interfere with the formation of the desired end product. Completion of the reaction is within 3-4 hours.

Figure 6:
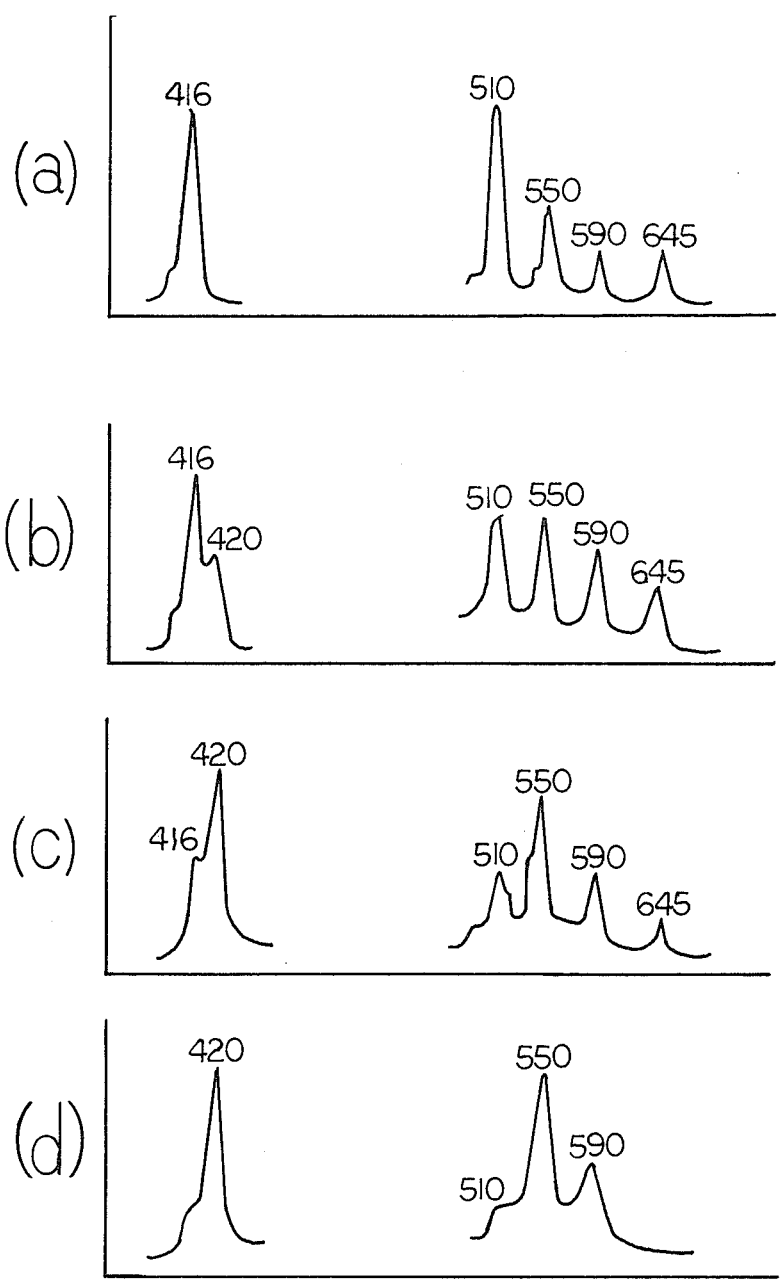
FIG. 6 is the UV and visible spectra of the formation of metallo-porphyrin from a free base tetraphenylporphyrin and lanthanide $\beta$-acetylacetonate.

The course of the reaction is followed by periodically taking aliquots of the reaction mixture, diluting with a suitable dilutent, such as acetone, and determining UV and visible absorption spectra. FIG. 6 shows these spectra; in terms of absorption (ordinate) versus wavelength (abscissa); the UV absorption throughout is far greater than the visible absorption but is indicated only in relative but arbitrary units as compared to the visible absorption for ease in demonstration. Unreacted free base porphyrin is characterized by a UV and visible absorption at $\sim$416 and 510, 550, 590 and 645 $\eta$m, respectively (FIG. 6a).

After 1 hour of reaction time (FIG. 6b), the metallo-porphyrin has already begun to form and is evidenced by the absorption peaks at $\sim$420 $\eta$m, $\sim$550 $\eta$m and $\sim$590 $\eta$m. After 2 hours (FIG. 6c), these peaks have increased still further. Finally, at 4 hours (FIG. 6d) virtually all free base porphyrin has been metallated and is indicated by the disappearance of the absorption peaks at $\sim$416 $\eta$m, $\sim$510 $\eta$m and $\sim$645 $\eta$m.

Upon completion of the reaction the solvent is distilled away under reduced pressure (water aspirator) with the aid of a slow stream of dry nitrogen. Since the solvent used is mostly non-volatile and high boiling, it is essential to remove it as completely as possible. It is preferable to gradually remove the solvent during the 75% product formation stage. During the final stage of the distillation, the reaction mixture becomes a very viscous fluid. Extreme care should be taken to insure the complete removal of all the solvent, since traces of solvent will create problems with respect to drying and later purification of the product. However, it is equally important to avoid overheating the reaction mixture as prolonged heating of the product causes conversion of the metallo-porphyrin compound back to the free base porphyrin. The flask should be cooled soon after the solvent is removed and magnetic stirring and nitrogen gas bleed continued until essentially all solvent is evaporated and the whole mixture cooled off to minimize decomposition. Finally, the crude product, which may still contain excess lanthanide acetylacetonate, is vacuum dried overnight. Column chromatography is used to further purify the product.

Fifteen new metallo-porphyrin compounds: yttrium (Y), lanthanum (La), cerium (Ce), prasedymium (Pr), samarium (Sm), europium (Eu), gadolinium (Gd), terbium (Tb), dysprosium (Dy), holmium (Ho), erbium (Er), thulium (Tm), ytterbium (Yb), lutetium (Lu), and thorium (Th), were synthesized by this method.

Due to the large ionic radius of the early series of lanthanide metals (i.e., Ce, Pr), these large metallo-porphyrin compounds are quite unstable and demetallate easily. For this reason, they are hard to recover and purify. Nevertheless, visible spectra were obtained for these complexes. Uranium tetraphenylporphyrin, the heaviest atom to form a porphyrin complex, was also observed by its visible spectrum; however, no isolated product was obtained. The later series of the lanthanides (i.e., Tb, Lu) form very stable complexes with little difficulty.

Unreacted $H_2TPP$ and lanthanide acetylacetonate are removed by column chromatography using a neutral aluminum oxide column ($2.5 \times 15$ cm) saturated with toluene. The crude product is dissolved in a minimum volume of toluene and applied to the column. $H_2TPP$ is eluted with toluene. The column is then eluted with acetone to remove all remaining $H_2TPP$, trace amounts of metallo-porphyrin and toluene solvent residues. Finally, dimethylsulfoxide (DMSO) is used to elute the majority of the metallo-porphyrin compound. The unreacted lanthanide acetylacetonate apparently remains at the top of the column. The DMSO fractions are treated with equal volumes of freshly distilled chloroform (previously treated with a 0.1 M NaOH solution) and extracted three times with equal volumes of water. The metallo-porphyrin compound is recovered from the chloroform solution by rotary evaporation under reduced pressure of approximately 20 mm Hg. The product is further purified by dissolving in base-treated chloroform, followed by precipitation with distilled methanol or by cooling. The product so obtained is dried under vacuum.

The following specific example exemplifies the present invention.

EXAMPLE

The amount of HCl ions present in the encapsulating RTV silicone elastomer is determined by potentiometer titration analysis of each of the component materials making up the final encapsulant, in this instance 50 ppm HCl was measured. Lutetium (acac) tetraphenylporphyrin (0.2 weight percent) is then added to hydroxy-terminated polydimethylsiloxane (silicone) dissolved in xylene (10 g/10 ml) and stirred overnight to facilitate the complexing of the free chloride ions to the protonated heterocyclic compound. A crosslinker, trimethoxymethylsilane (1.5 g) is added, stirred 15 minutes and then a titanium catalyst, tetraalkoxytitanate, which has been treated with methanol is added (0.075 g). After 16 hours at room temperature, a transition metal β-diacetylacetonate (0.2 weight percent) is added as a thermal stabilizer and the mixture stirred. The resulting formulation is poured onto the device, cured at room temperature for 11 hours and then at 120° C. for four additional hours so that a homogeneous RTV elastomer is formed.

What is claimed is:

1. A method of sequestering HCl and chelating anions on an electronic device which comprises applying to the device an encapsulant containing therein a metallo-porphyrin compound.

2. The method as recited in claim 1 wherein the anions include a halogen.

3. The method as recited in claim 2 wherein the halogen is a chloride ion.

4. The method as recited in claim 1 wherein the metal is selected from the group consisting of the lanthanide series.

5. The method as recited in claim 1 wherein the metal is complexed with a β-diketone ligand.

6. The method as recited in claim 5 wherein the β-diketone is acetyl acetone and derivatives thereof.

7. The method as recited in claim 1 wherein the porphyrin ligand of the metallo-porphyrin compound has the structural formula:

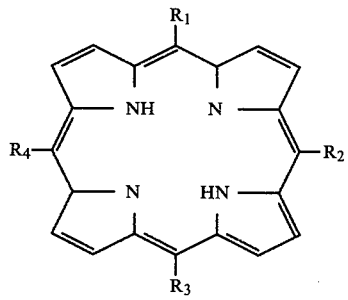

wherein $R_1$, $R_2$, $R_3$ and $R_4$ is a 1 to 7 carbon alkyl, a phenyl, a p-methyphenyl, a fluorophenyl or any derivative thereof.

8. The method as recited in claim 1 wherein the metallo-porphyrin compound is a lanthanide tetraphenylporphyrin.

9. The method as recited in claim 1 wherein the metallo-porphyrin is added to the encapsulant in at least a 2:1 stoichiometric molar quantity as determined by the number of moles of anionic impurity in the encapsulant.

10. The method as recited in claim 1 wherein the encapsulant is a polymeric composition.

11. The method as recited in claim 10 wherein the polymeric composition is a polymeric silicone.

12. An article of manufacture comprising an electronic device and an encapsulant thereover, the encapsulant containing therein a metallo-porphyrin compound.

13. The article of manufacture as recited in claim 12 wherein the metal of the metallo-porphyrin is a member of the lanthanide series.

14. The article of manufacture as recited in claim 12 wherein the metal of the metallo-porphyrin is also complexed as a β-diketonate.

15. The article of manufacture as recited in claim 14 wherein the β-diketonate is acetylacetonate and derivatives thereof.

16. The article of manufacture as recited in claim 12 wherein the porphyrin of the metallo-porphyrin compound has the structural formula:

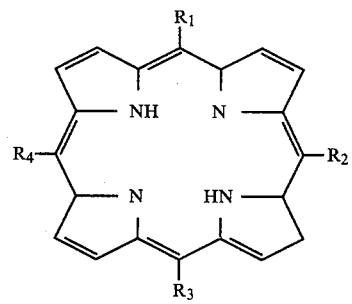

wherein $R_1$, $R_2$, $R_3$ and $R_4$ is a 1 to 7 carbon alkyl, a phenyl, a p-methylphenyl, a fluorophenyl or any derivative thereof.

17. The article of manufacture as recited in claim 15 wherein the metallo-porphyrin compound is a lanthanide tetraphenylporphyrin.

18. The article of manufacture as recited in claim 14 wherein the metallo-porphyrin compound is present in the encapsulant in at least a 2:1 stoichiometric molar quantity as determined by the number of moles of anionic impurity in the encapsulant.

19. The article of manufacture as recited in claim 12 wherein the encapsulant is a polymeric composition.

20. The article of manufacture as recited in claim 19 wherein the polymeric composition is a polymeric silicone.

21. A composition of matter comprising a polymeric silicone encapsulant having dissolved therein a metallo-porphyrin compound.

22. A composition of matter as recited in claim 21 wherein the metal of the metallo-porphyrin is selected from the group consisting of the lanthanide series.

23. The composition of matter as recited in claim 21 wherein the metallo-porphyrin is a lanthanide tetraphenylporphyrin.

24. The composition of matter as recited in claim 21 wherein the metal of the metallo-porphyrin is also complexed as a β-diketonate.

25. The composition of matter as recited in claim 24 wherein the β-diketonate is selected from the group consisting of acetylacetonate and derivatives thereof.

26. The composition of matter as recited in claim 21 wherein the porphyrin ligand has the structural formula:

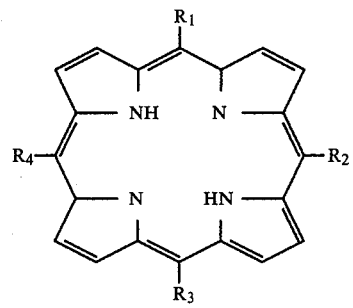

wherein $R_1$, $R_2$, $R_3$ and $R_4$ is a 1 to 7 carbon alkyl, a phenyl, a p-methylpenyl, a fluorophenyl, or any derivative thereof.

27. The composition of matter as recited in claim 21 wherein the metallo-porphyrin compound is added to the encapsulant in at least a 2:1 stoichiometric molar quantity as determined by the number of moles of anionic impurity in the encapsulant.

28. An article of manufacture comprising an electronic device and an encapsulant thereover, the encapsulant containing therein a porphyrin compound.

29. A composition of matter comprising a polymeric silicone encapsulant having contained therein a porphyrin.

* * * * *